United States Patent [19]

Pinnau et al.

[11] Patent Number: 5,688,307
[45] Date of Patent: Nov. 18, 1997

[54] SEPARATION OF LOW-BOILING GASES USING SUPER-GLASSY MEMBRANES

[75] Inventors: Ingo Pinnau, Palo Alto; Kaaeid Lokhandwala, Menlo Park; Phuong Nguyen, Fremont; Scott Segelke, Mountain View, all of Calif.

[73] Assignee: Membrane Technology and Research, Inc., Menlo Park, Calif.

[21] Appl. No.: 608,706

[22] Filed: Feb. 29, 1996

[51] Int. Cl.$^6$ .................................................. B01D 53/22
[52] U.S. Cl. .................................................. 95/50; 95/45
[58] Field of Search .................................................. 95/45, 47–55

[56] References Cited

U.S. PATENT DOCUMENTS

| | | | |
|---|---|---|---|
| 4,657,564 | 4/1987 | Langsam | 55/16 |
| 4,755,193 | 7/1988 | Higashimura et al. | 55/16 |
| 4,842,718 | 6/1989 | Luteijn et al. | 95/50 X |
| 4,857,078 | 8/1989 | Walter | 95/50 |
| 4,859,215 | 8/1989 | Langsam et al. | 55/16 |
| 5,013,338 | 5/1991 | Anand et al. | 55/158 |
| 5,281,255 | 1/1994 | Toy et al. | 95/50 |
| 5,501,722 | 3/1996 | Toy et al. | 95/50 |

OTHER PUBLICATIONS

Nakagawa et al., "Polyacetylene Derivatives as Membranes for Gas Separation," Gas Separation and Purification, vol. 2, p. 3, 1988.

Asakawa et al., "Composite Membrane of Poly[1–(trimethylsilyl)–propyne] as a Potential Oxygen Separation Membrane," Gas Separation and Purification, vol. 3, p. 117, 1989.

Koros et al., "Sorption and Transport of Various Gases in Polycarbonate," J. Memb. Sci., vol. p. 163, 1977.

Plate et al., "Gas and Vapor Permeation and Sorption in poly(trimethylsilylpropyne)," J. Memb. Sci., vol. 60, p. 13, 1991.

Langsam et al., "Substituted Propyne Polymers," Gas Sep. & Purif., vol. 2, p. 162, 1988.

Takada et al., "Gas Permeability of Polyacetylenes Carrying Substituents," J. Appl. Polymer Sci., vol. 30, p. 1605, 1985.

Srinivasan et al., "Elucidating the Mechanism(s) of Gas Transport in Poly[1–(trimethylsily)–1–Propyne] (PTMSP) Membranes," J. Memb. Sci., vol. 86, p. 67, 1994.

Auvil et al., "Mechanisms of Gas Transport in Poly(1–Trimethylsilyl–1 Propyne)," Polymer Preprints vol. 32, 1991.

Baker et al., "Nitrogen Separation from Natural Gas Using Membranes," Presented to AIChE, Houston, TX, Feb. 1993.

Toy et al., "Gas Transport Through Poly(1–Trimethylsilyl–1–Propyne) Membranes in the Presence of Organic Vapors," Presented at NAMS, Breckenridge, CO, May 1994.

Pinnau, "Membrane Material Selection for the Separation of Condensable Gases," Presented at GKSS Research Center, Sept. 1995.

Pinnau et al., "Poly(1–Trimethylsilyl–1–Propyne)–Superglassy Polymer w/ Extraordinary Properties for Sep. of Organic Vapors from Permanent Gases," Presented at NAMS, Portland, OR, May 1995.

*Primary Examiner*—Robert Spitzer
*Attorney, Agent, or Firm*—J. Farrant

[57] ABSTRACT

A process for separating hydrocarbon gases of low boiling point, particularly methane, ethane and ethylene, from nitrogen. The process is performed using a membrane made from a super-glassy material. The gases to be separated are mixed with a condensable gas, such as a $C_{3+}$ hydrocarbon. In the presence of the condensable gas, improved selectivity for the low-boiling-point hydrocarbon gas over nitrogen is achieved.

20 Claims, 2 Drawing Sheets

5,688,307

SEPARATION OF LOW-BOILING GASES USING SUPER-GLASSY MEMBRANES

This invention was made with Government support under Contract Number DE-FG03-94ER81811. The Government has certain rights in this invention.

FIELD OF THE INVENTION

The invention is a membrane-based gas-separation process for separating $C_1$ or $C_2$ hydrocarbons from nitrogen.

BACKGROUND OF THE INVENTION

The unusual gas-separation properties of "super-glassy" polymers, of which polytrimethylsilylpropyne (PTMSP) is the best known, have been the subject of many papers and patents in recent years.

In particular, it has recently been shown that such materials are useful for separating more condensable vapors from less condensable vapors or from gases. For example, U.S. Pat. No. 5,281,255, co-owned with the present application, teaches a process for recovering a condensable organic component from a gas stream, using a membrane made from a polymer that has a glass transition temperature of at least about 100° C. and a free volume of at least about 10%. The condensable component permeates the membrane preferentially and is enriched in the permeate stream. Mixed-gas selectivities of 7 or more for propane over methane, and 20 or more for butane over methane, have been obtained.

Earlier membrane work in the area was performed with pure gases, particularly the permanent gases oxygen and nitrogen. In thee experiments, it was found that PTMSP and similar materials have extremely high permeabilities to all gases, but poor selectivities. Also, thee membrane properties did not appear to be stable over time. Some attempts were made to improve both the stability and the selectivity. For example, a paper by T. Nakagawa et al. ("Polyacetylene derivatives as membranes for gas separation", Gas Separation and Purification, Vol. 2, pages 3–8; 1988) discusses the performance of PTMSP membranes that have been deliberately exposed to a variety of additives, including dioctyl phthalate (DOP) and polyethylene glycol (PEG). The treated membranes exhibited permeation properties stable over time, and, although the oxygen permeability was reduced from 8,000 Barrer to about 300–400 Barrer, the oxygen/nitrogen selectivity improved from 1.6 to 3.3, rendering the membranes "prospective as membranes for oxygen enrichment". Similar results have been reported by S. Asakawa et al. ("Composite membrane of poly[1-(trimethylsilyl)-propyne] as a potential oxygen separation membrane", Gas Separation and Purification, Vol. 3, pages 117–122, 1989), who apparently produced stable PTMSP membranes by coating the PTMSP layer with a protective layer of silicone rubber, and who also concluded that, "This membrane, therefore, may be promising for industrial oxygen separation." M. Langsam et al. (U.S. Pat. No. 4,859,215, Aug. 22, 1989, assigned to Air Products and Chemicals, Inc.) added Nujol oil, silicone oil or ethylene oxide-based surfactants to the casting solution when preparing PTMSP membranes. The membranes showed permeation properties stable over time, reduced permeabilities and improved selectivities for oxygen/nitrogen and carbon dioxide/nitrogen.

Other attempts to modify the material to increase its selectivity have been made. For example, U.S. Pat. No. 4,657,564, to M. Langsam, assigned to Air Products and Chemicals, Inc., describes a surface fluorination technique that increases the oxygen/nitrogen selectivity by at least 50% over its unmodified value.

The permanent gas selectivities achieved by these approaches were still relatively poor, and interest in using PTMSP and related materials for separation of permanent or low-boiling-point gases has waned. To applicants' knowledge, no industrial use of these materials for such separations has been made.

SUMMARY OF THE INVENTION

The invention is a process for separating low-boiling-point hydrocarbon gases, particularly $C_1$ and $C_2$ hydrocarbon gases, from nitrogen.

The process is performed using a membrane made from a super-glassy material. Super-glassy materials, explained in more detail below, are characterized by high glass transition temperatures, unusually high free volume within the polymer and very high permeability for all gases. The gases to be separated are mixed with a condensable gas that has a boiling point at least about 40° C. above the boiling point of the low-boiling-point hydrocarbon gas at atmospheric pressure. Preferably, the condensable gas has a greater affinity for the hydrocarbon gas than for nitrogen, such as being, when in liquid form, a better solvent for the hydrocarbon gas than for nitrogen. Most preferably, the condensable gas is a $C_{3+}$ hydrocarbon.

We have found that, in the presence of the condensable gas, unexpectedly improved and useful selectivities for the low-boiling-point hydrocarbon gases over nitrogen are possible.

In its basic form, the process of the invention comprises:
(a) providing a membrane having a feed side and a permeate side; said membrane comprising a polymer material characterized by:
  (i) a glass transition temperature, $T_g$, of at least about 100° C.,
  (ii) a free volume $V_F$ of at least about 10%, and
  (iii) a methane permeability at room temperature of at least about 1,000 Barrer;
(b) contacting said feed side with a gas mixture comprising:
  (i) a hydrocarbon gas chosen from the group consisting of methane and ethylene,
  (ii) nitrogen, and
  (iii) a condensable gas that has a boiling point at least about 40° C. above the boiling point of said hydrocarbon gas at atmospheric pressure;
(c) withdrawing from said permeate side a permeate stream enriched in said hydrocarbon gas and said condensable gas compared with said gas mixture;
(d) withdrawing from said feed side a residue stream enriched in nitrogen compared with said gas mixture.

The driving force for permeation across the membrane is the pressure difference between the feed and permeate sides, which can be generated in a variety of ways.

Because the membrane materials are glassy and rigid, an unsupported film of the polymer may often be usable as a single-layer gas separation membrane. Alternatively, the separation membrane may be a layer that forms part of a thicker structure, such as an asymmetric membrane or a composite membrane.

The membrane separation process may be configured in many ways, and may include a single membrane unit or an array of two or more units in multi-stage or multi-step arrangements.

The process may be carried out on a gas stream that already contains a combination of gases that meets the limiting criteria above. Alternatively, the process may be rendered possible by adding an appropriate condensable component to the gas mixture.

The process has been found to be particularly useful in treating raw natural gas. The process is also particularly useful for treating purge gas streams generated during manufacture of ethylene-based polymers, such as polyethylene or ethylene copolymers.

DETAILED DESCRIPTION OF THE INVENTION

Figure 1:
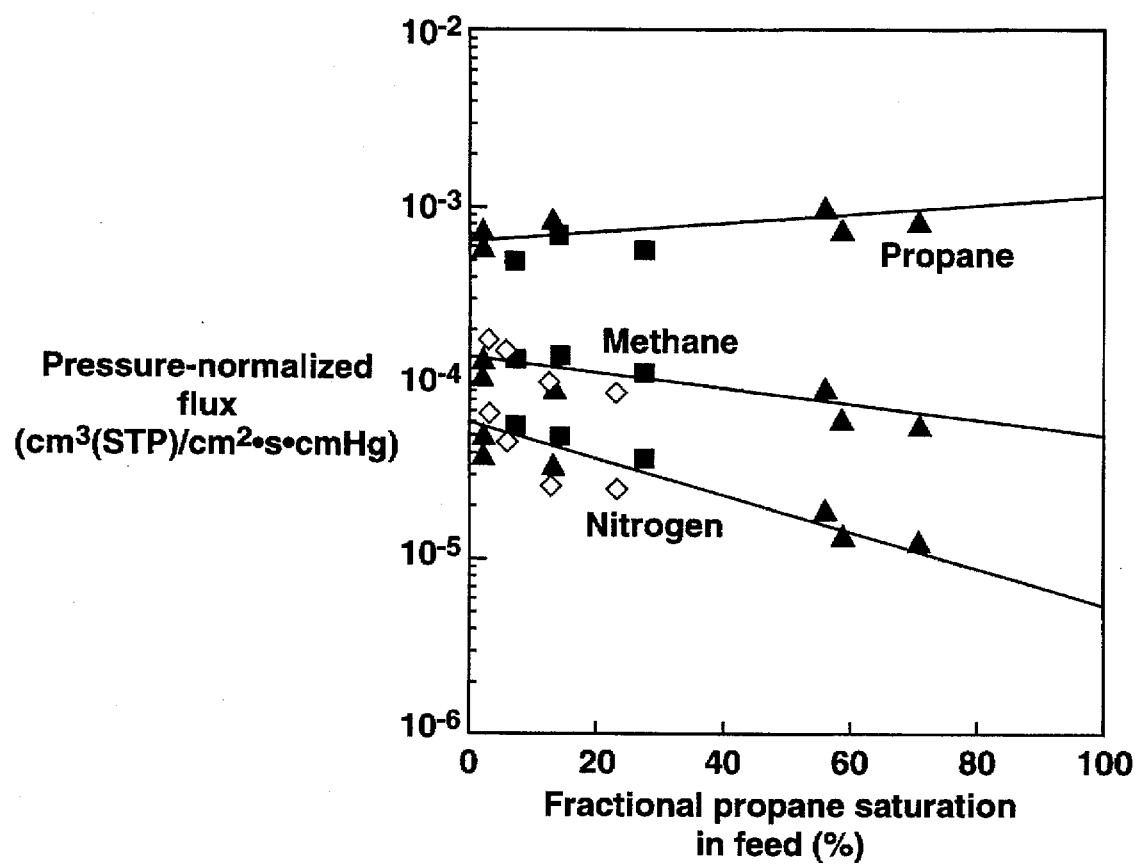
FIG. 1 is a graph of pressure-normalized flux as a function of fractional saturation of the feed gas with condensable gas.

As used herein, the word gas, used without other limiting definition, means gas or vapor.

As used herein, $C_{3+}$ hydrocarbon means a straight-chain, branched-chain or cyclic saturated or unsaturated hydrocarbon having three or more carbon atoms.

The invention is a process for separating low-boiling-point hydrocarbon gases, particularly $C_1$ and $C_2$ hydrocarbon gases, and most particularly methane and ethylene, from nitrogen. The process of the invention may be carried out on any gas stream that includes the two components that it is desired to separate.

In its most basic aspect, the invention involves running a feed stream containing the low-boiling-point hydrocarbon gas and nitrogen across the feed side of a membrane in the presence of a condensable gas. If the feed gas stream to be treated is at high pressure compared with atmospheric, the separation may be effected simply by making use of this high pressure to provide an adequate driving force and pressure ratio. Otherwise, a pressure difference can be provided by compressing the feed stream, by drawing a vacuum on the permeate side of the membrane, or a combination of both.

The process of the invention differs from other membrane-based gas separations in the combination of (a) the gases to be separated, (b) the presence of the condensable gas, and (c) the nature of the membrane used to perform the separation.

Taking element (c) first, the type of membrane that we have found to be useful for the process of the invention is formed from the so-called "super-glassy" polymers. These materials are characterized by having a rigid structure, high glass transition temperatures, typically above 100° C., 200° C. or higher, and unusually high free volume within the polymer material, such as more than 10%, more than 20% or even as high as 25% or more (as estimated from vapor solubility data according to the method of W. J. Koros et al., J. Membrane Science, Vol. 2, page 165, 1977). In contrast, conventional glassy polymers typically have free volumes within the polymer itself of a few percent, such as 3% for polycarbonate, or 6% for polyphenylene oxide. Super-glassy materials useful for carrying out the invention exhibit unusual behavior for glassy materials in that they preferentially permeate larger, more condensable molecules over smaller, less condensable molecules, so that they are selective, albeit slightly at room temperature, for methane over nitrogen, ethane over nitrogen or ethylene over nitrogen. Super-glassy materials useful for carrying out the invention are further characterized in that they have a high methane permeability and a high ethylene permeability at room temperature, by which we mean a permeability of at least about 1,000 Barrer (where 1 Barrer=$1 \times 10^{-10}$ cm$^3$(STP) ·cm/cm$^2$·s·cmHg).

Without wishing to be bound by theory, we believe that certain of the high-free-volume, glassy polymers are useful in our invention because their permeation properties are not governed by solution/diffusion (the mechanism of gas transport in conventional, low-free-volume polymers), but are more akin to transport in microporous polymers, as discussed in more detail below. If numerical values for free volume, glass transition temperature and/or methane permeability are not to hand, therefore, a simple, first-pass screening technique to identify likely high-free-volume glassy polymers for carrying out our invention is to examine the oxygen and nitrogen permeability data. Such data are much more readily available for many materials than methane permeability data, and will enable potential candidate materials to be rapidly identified. We believe materials with the required structure to meet the demands of our invention will normally have oxygen permeabilities at room temperature of at least about 500 Barrer and oxygen/nitrogen selectivity at room temperature of no more than about 2.5.

The best known of the super-glassy materials, and representative of the class, is polytrimethylsilylpropyne (PTMSP), which has a free volume of about 25% according to the above-mentioned method. Although PTMSP is rigid and glassy, up to at least about 200° C., it exhibits an oxygen permeability of 10,000 Barrer or above, more than 15 times higher than that of silicone rubber, previously the most permeable polymer known. The high permeability appears to be associated with an unusually high free-volume within the polymer material, and has been confirmed with many examples of pure gases and vapors, including oxygen, nitrogen, hydrogen, helium, methane, ethane, propane, butane and higher hydrocarbons, sulfur hexafluoride and carbon dioxide. Pure-gas data indicate that PTMSP exhibits poor selectivity for most gas separations. For example, the selectivity for oxygen/nitrogen is about 1.5–1.8, and in fact the material has been characterized as exhibiting selectivities too low for commercial use. References that cite selectivities and support this view include N. A. Platé al., "Gas and vapor permeation and sorption in poly-(trimethylsilylpropyne)", (Journal of Membrane Science, Vol. 60, pages 13–24, 1991), M. Langsam et al., "Substituted Propyne Polymers. I. Chemical surface modification of poly[1-(trimethylsilyl)propyne] for gas separation membranes", (Gas Separation and Purification, Vol. 2, pages 162–170, 1988) and K. Takada et al., "Gas Permeability of Polyacetylenes Carrying Substituents", (Journal of Applied Polymer Science, Vol. 30, pages 1605–1616, 1985). These references are discussed in detail in U.S. Pat. No. 5,281,255, which is incorporated herein by reference.

Our experimental measurements are in agreement with the general observations above, and we have measured unattractively low selectivities for several mixtures of low-boiling-point gases. For example, with pure gases, we have measured a methane permeability of about 15,400 Barrer and a nitrogen permeability of 6,300 Barrer, yielding a calculated pure gas selectivity of about 2.4. For two-component methane/nitrogen mixtures, the selectivity is of the same order. Nevertheless, we have found that, by following the process of the invention, improved, more useful selectivities for $C_1$ and $C_2$ hydrocarbons over nitrogen can be obtained.

Non-limiting examples of the types of polymer materials useful for carrying out the processes of the invention include members of the following structure groups that also meet the above glass-transition temperature, free volume and permeation limits:

(i) Substituted acetylenes, having the general structural formula

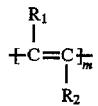

where $R_1$ and $R_2$ are independently hydrogen, a halogen, $C_6H_5$ or a linear or branched $C_1$–$C_4$ alkyl group.

(ii) Silicon-containing polyacetylenes, having the general structural formula

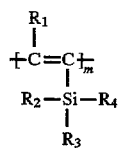

where $R_1$ is a linear or branched $C_1$–$C_4$ alkyl group, $R_2$ and $R_3$ are independently linear or branched $C_1$–$C_6$ alkyl groups, and $R_4$ is a linear or branched $C_1$–$C_2$ alkyl or aryl group.

(iii) Germanium-containing polyacetylenes, having the general structural formula

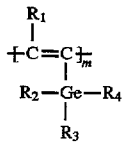

where $R_1$ is a linear or branched $C_1$–$C_4$ alkyl group, $R_2$ and $R_3$ are independently linear or branched $C_1$–$C_6$ alkyl groups, and $R_4$ is a linear or branched $C_1$–$C_{12}$ alkyl or aryl group.

(iv) Copolymers of any of the above with each other or with other polymer materials.

A particularly useful polymer material falling within the general definitions above is poly(trimethylsilylpropyne) (PTMSP), which has the structure:

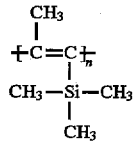

Membranes useful in the process of the invention may be formed from super-glassy materials in a variety of ways. Because the materials are glassy and rigid, an unsupported film of the polymer may often be usable as a single-layer gas separation membrane. Alternatively, the membrane may be an integral asymmetric membrane, comprising a dense region that forms the separation membrane and a microporous support region. As a further alternative, the membrane may be a composite membrane comprising the separation membrane and an attached or unattached backing layer, or a composite membrane comprising a microporous support membrane of one polymer coated with the separation membrane of another polymer. Applicants prefer to use composite membranes.

The membranes may be formed as flat sheets, hollow fibers or any other convenient form, and housed in any appropriate type of module, such as plate-and-frame, potted fiber or spiral-wound. Spiral-wound modules are a preferred choice.

Another aspect, (a) above, that defines the invention in combination with the others, is the nature of the gas pair robe separated. Nitrogen has a boiling point at atmospheric pressure of $-198°$ C. and a critical temperature of $-147°$ C. at 33.5 atmospheres. Methane has a boiling point of $-161°$ C. at atmospheric pressure and a critical temperature of $-82°$ C. at 46 atmospheres. Ethylene has a boiling point of $-103°$ C. at atmospheric pressure and a critical temperature of $10°$ C. at 50 atmospheres. Ethane has a boiling point of $-88°$ C. at atmospheric pressure and a critical temperature of $32°$ C. at 48 atmospheres. Thus, both gases of the pair to be separated are noncondensable, or at least far from their boiling points, at the temperature/pressure conditions at which the separation is carried out.

The last aspect, (b) above, that defines the invention is that the gas stream to be separated contains a condensable gas, so that the separation of the low-boiling-point hydrocarbon gas from nitrogen is performed in the presence of the condensable gas. In the broadest definition, the condensable gas can be any gas that has a boiling point at least about $40°$ C. higher than the low-boiling-point hydrocarbon gas at atmospheric pressure. Preferably, the condensable gas has a greater affinity for the hydrocarbon gas than for nitrogen, such as being, when in liquid form, a better solvent for the hydrocarbon gas than for nitrogen.

Most preferred gases from which the condensable gas may be chosen are $C_{3+}$ hydrocarbons. Examples include propane, butane, pentane, hexane and other straight-chain and branched-chain hydrocarbons, and cyclic hydrocarbons, such as benzene and cyclohexane.

We have discovered that, in the presence of the condensable gas, super-glassy membranes can exhibit an improved selectivity for methane/nitrogen, ethane/nitrogen and ethylene/nitrogen. For example, in a two-component methane/nitrogen mixture, we have calculated the selectivity of a PTMSP membrane to be about 2.6. In the presence of a suitable condensable gas, a selectivity of 6 or more can be obtained. In this type of separation, a permeate stream enriched in the $C_1$ or $C_2$ hydrocarbon gas and the condensable gas compared with the feed gas is withdrawn from the permeate side of the membrane. A residue stream correspondingly depleted in the $C_1$ or $C_2$ hydrocarbon gas and the condensable gas, and enriched in nitrogen compared with the feed gas, is withdrawn as the residue stream from the feed side.

Thus, the process of the invention in basic form is as follows:

(a) providing a membrane having a feed side and a permeate side; said membrane comprising a polymer material characterized by:

(i) a glass transition temperature, $T_g$, of at least about $100°$ C., (ii) a free volume $V_F$ of at least about 10%, and (iii) a methane permeability at room temperature of at least about 1,000 Barrer;

(b) contacting said feed side with a gas mixture comprising:

(i) a hydrocarbon gas chosen from the group consisting of methane and ethylene, (ii) nitrogen, and (iii) a condensable gas that has a boiling point at atmospheric pressure that is at least about $40°$ C. above the boiling point of said hydrocarbon gas at atmospheric pressure;

(c) withdrawing from said permeate side a permeate stream enriched in said hydrocarbon gas and said condensable gas compared with said gas mixture;

(d) withdrawing from said feed side a residue stream enriched in nitrogen compared with said gas mixture.

Without wishing to be bound by theory, we believe our invention can be understood in terms of the unusual gas-transport properties of super-glassy membranes. We believe these properties are related to the very high free volume and the large intersegmental gaps between free-volume elements in super-glassy materials.

In rubbery and conventional low-free-volume glassy polymers, gas and vapor transport through a nonporous membrane is determined by a solution/diffusion mechanism. The solution/diffusion model considers the membrane to be analogous to a liquid solvent for the permeating gases. In this model, it is assumed that gas at the high-pressure side of the membrane dissolves in the membrane material and diffuses down a concentration gradient to the low-pressure side of the membrane, where it is desorbed. It is also assumed that sorption and desorption are rapid, so that diffusion is the rate-limiting step. Diffusion takes place through free-volume elements dispersed in the continuous polymer matrix. These free-volume elements are not fixed pores, but are present as statistical fluctuations that appear and disappear, as a result of thermal motions of the polymer chains, over about the same time scale as the motions of the permeants traversing the membrane.

In a porous membrane, on the other hand, the free-volume elements (pores) do not fluctuate in position or volume on the time scale of the permeant motion. Also, the pores are interconnected, so that permanent pathways exist by which molecules may pass through the membrane. The pore-flow transport mechanism depends on the size of the individual free-volume elements relative to the sizes of the diffusing gas molecules. Microporous materials with pore dimensions on the order of 3-5 Å act as molecular sieves and separate gases based exclusively on the difference in size. Microporous membranes with relatively large pores, having dimensions approaching the order of the mean free paths of the gas molecules, that is, in the hundreds of Angstroms range, separate gases by Knudsen diffusion. Microporous materials with pore dimensions of the order of 5-50 Å separate gases and vapors based on differences in solubility of the components. The more condensable component sorbs onto the walls of the pores, eventually producing multilayer adsorption or even capillary condensation, in which the pores are partially or completely blocked by the adsorbed component. This effect reduces the flow of less-condensable or non-condensable gas through the membrane.

Whether gas transport takes place predominantly by solution/diffusion or pore flow depends on the relative permanence of the free-volume elements. The larger the individual free-volume elements, the more likely they are to be present long enough to produce "permanent" free-volume regions. If the free-volume regions are large enough to interconnect, the material will show pore-flow characteristics.

The gas transport mechanism in super-glassy materials appears to lie in a transition region between solution/diffusion and pore flow. Because of its high free volume, the polymer is dose to passing, or has passed, from bring a polymer with a distribution of transient free-volume elements to an ultra-microporous material in which pore-flow transport by preferential sorption occurs.

This explanation of the transport mechanism in super-glassy materials is consistent with our earlier discovery, described in U.S. Pat. No. 5,281,255, that membranes made from super-glassy polymers exhibit anomalous behavior for glassy materials, in that they preferentially permeate larger, more condensable molecules over smaller, less condensable molecules.

Whether sorption of the potentially condensable gas occurs as described above, or whether some completely different phenomenon is responsible for the effects observed, the result is that the presence of the condensable gas depresses the permeability of the membrane to both gases of the pair to be separated. This depression of permeability can be very marked, such as 50%, 70% or even 90% or more. However, the super-glassy materials are so highly permeable that even if the permeability of a gas is reduced to 10% or less of its pure gas value, industrially useful fluxes can be provided.

For example, we have measured the permeability of a PTMSP film to pure methane to be about 15,400 Barrer. In admixture with n-butane, we have measured the methane permeability to be depressed to about 1,800, or about 12% of the pure gas value. Nevertheless, this permeability still translates to a pressure-normalized flux of about $8 \times 10^{-5}$ cm$^3$(STP)/cm$^2$·cmHg through a 20-micron-thick PTMSP layer. Preferably, the flux of the faster permeating gas of the pair to be separated, that is the $C_1$ or $C_2$ hydrocarbon gas, should be at least $1 \times 10^{-5}$ cm$^3$(STP)/cm$^2$·s·cmHg, more preferably at least $5 \times 10^{-5}$ cm$^3$(STP)/cm$^2$·s·cmHg and most preferably at least $1 \times 10^{-4}$ cm$^3$(STP)/cm$^2$·s·cmHg. For most gas combinations, there should be no difficulty reaching these figures with super-glassy membranes.

This depression of permeability is unlike the mechanism that occurs in sorption of, for example, carbon dioxide or an organic vapor into a conventional polymer membrane. In this case, the membrane becomes plasticized or swollen by the sorbed material, resulting in a higher permeability to all components, and usually in a reduced selectivity.

We have found that the permeability to the low-boiling-point hydrocarbon is less depressed than the permeability to nitrogen, resulting in an increased selectivity for methane, ethane or ethylene over nitrogen. The presence of even small amounts of condensable gas, such as a few volume percent, can affect the permeation properties of the other gases and produce useful improvements in selectivity. A better measure of the influence of the condensable gas is obtained from the activity, which can be expressed as the ratio $p/p_{sat}$, where p is the partial pressure of condensable gas in the gas mixture and $p_{sat}$ is the corresponding saturated vapor pressure.

We found that, as the activity of condensable gas in the mixture increases, the more are depressed the permeabilities of the other components, the greater is the difference between those permeabilities, and hence the greater is the selectivity for the $C_1$ or $C_2$ hydrocarbon gas over nitrogen. Above a certain activity, however, we found that the permeabilities of the gases to be separated level off and become relatively independent of the activity of condensable gas. This may represent the maximum sorption of condensable gas. At this point, increasing the activity of condensable gas, by increasing the amount in the mix, or raising the pressure, does not result in any further improvement in selectivity for the $C_1$ or $C_2$ hydrocarbon gas over nitrogen.

We believe that useful improvements in selectivity may be obtainable with activities of condensable gas even as low as 0.05 or below, that is the partial pressure of condensable gas under the conditions of the separation is only 5% of the corresponding saturated vapor pressure of the condensable gas. Preferably, however, the activity should be higher, such as at least 0.1, that is the partial pressure of condensable gas under the conditions of the separation is at least 10% of the corresponding saturated vapor pressure. More preferably, the activity should be at least about 0.2, that is partial pressure at least 20% of the corresponding saturated vapor pressure. Most preferable, we believe, is to operate with the activity of condensable gas at about 0.4, 0.5 or 0.6, with the proviso that the exact number at which the optimum improvement in selectivity is obtained obviously depends on the specific gases, membrane used, and other separation conditions, and may be higher or lower than these typical numbers.

Likewise, the improvement in selectivity that can be obtained by the process of the invention depends on the specifics of the separation being performed. Typically, we believe that improvements over the selectivity attainable without the condensable gas of at least 40%, and frequently 50%, 70% or even 100% or more are possible. For example, as stated above, we have measured the selectivity of PTMSP for methane over nitrogen to be about 2.6 in a two-component mixture of the gases. In a mixture including 12% propane and n-butane, the methane/nitrogen selectivity increases to about 4, the selectivity being measured under otherwise similar conditions. In three-component mixtures of methane, nitrogen and propane, we have measured a methane/nitrogen selectivity as high as 6, and believe that even higher selectivity is possible.

Depending on the separation to be performed, the selectivity that can be obtained and other operating constraints that may be present, the separation may be carried out in a single membrane stage or in multiple stages, in which either the residue or permeate streams, or both, from the first bank of membrane modules are subjected to additional processing. However, if long trains of modules are required to perform the separation, care should be taken that the activity of the condensable gas remains high enough to be effective at all points along the membrane train. This result could be achieved in a number of ways that will suggest themselves to those of skill in the art, for example, by progressively cooling the feed gas as it passes from the first to the last module. As the temperature of the feed gas drops, less of the condensable gas is required to maintain the activity in the useful range. As another alternative, additional amounts of the condensable component can be mixed into the feed gas at an intermediate point or points along the train.

A suitable gas to serve as the potentially condensable component may already be present in the gas mixture. For example, suppose the process of the invention is to be applied to treating a natural gas stream containing methane and nitrogen, so as to remove nitrogen. Essentially all raw natural gas contains at least a few percent of $C_{3+}$ hydrocarbons, such as propane, butane, pentane and so on. Therefore, it is probable that sufficient of at least one of these will be present to carry out the separation with the benefit of a higher methane/nitrogen selectivity than would be obtainable in a two-component mixture.

Other streams that contain methane and nitrogen and that are candidates for separation by the process of the invention include streams from carbon dioxide miscible flooding of oil reservoirs for enhanced oil recovery (EOR), streams from nitrogen pressurization of underground oil/gas formations, landfill gas or biogas, and gas streams from petrochemical and other chemical processing.

If insufficient condensable gas or no condensable gas is present in the raw stream to be treated, an appropriate condensable gas may be added to the gas mixture at any convenient point upstream of the membrane separation unit, and optionally removed again by condensation downstream of the unit.

So far, the invention has been described in detail as it pertains to the separation of nitrogen and methane. It will be apparent to those of skill in the art that the separation of ethylene from nitrogen presents similar difficulties. Ethylene also has a small molecular diameter, a low boiling point and only moderately better solubility in polymer materials than nitrogen. Therefore, the separation of this gas pair suffers, like methane/nitrogen separation, from a lack of membrane materials with good enough discrimination ability for a practical process. For example, silicone rubber membranes exhibit a mixed gas ethylene/nitrogen selectivity of about 5 at room temperature. Although useful in a limited context, this is still too low to make membrane-based ethylene/nitrogen separation very attractive. A selectivity of 10 or 15 would improve separation performance and economics substantially. We believe that such a selectivity is achievable by following the teachings of the invention as already described.

A particularly useful application of our process in this regard is the treatment of purge gas streams from polyethylene manufacturing plants. In the production of polyethylene, nitrogen is often used to purge residual ethylene from the polymer product. This results in a waste stream containing ethylene and nitrogen, and frequently containing heavier hydrocarbons, such as butane or hexane, depending on the specifics of the polymerization process used. The process of the invention can be used to separate the monomer from the nitrogen purge gas. The feed stream, containing ethylene, nitrogen and a $C_{3+}$ condensable hydrocarbon, passes across the feed side of the membrane. A residue stream, enriched in nitrogen and depleted in ethylene and condensable hydrocarbon, is withdrawn from the feed side. A permeate stream, enriched in ethylene and condensable hydrocarbon, and depleted in nitrogen, is withdrawn from the permeate side. In some cases, this enables the nitrogen and/or ethylene to be recovered for reuse. As in the case of methane/nitrogen separation, if insufficient condensable component is present in the purge gas, it may be added to the feed stream, withdrawn with the ethylene in the concentrated hydrocarbon stream and then separated from the ethylene by cooling and condensation.

Gas streams generated during petroleum-refining operations often contain methane and heavier hydrocarbons mixed with hydrogen. Separating the heavier hydrocarbons from the stream can be accomplished in various ways, but efficient techniques for separating methane and hydrogen are lacking. We have not yet been able to generate any conclusive data, but we suspect that a process similar to that of the invention, using super-glassy membranes and performing the separation in the presence of a condensable gas, may be found to be useful for separating methane from hydrogen.

It will be apparent to those of skill in the art that any operating conditions, such as feed pressure, permeate pressure, operating temperature, stage cut and apparatus configuration, that have not been specifically defined herein may be chosen as appropriate to the circumstances of the separation.

The process of the invention may be augmented by other techniques for improving the selectivity of the membranes, such as by modifying the structure of the polymer or incorporating additives. A useful and preferred additional technique appropriate to many separations is to operate at subambient temperatures. The cooling required to enhance selectivity further can be obtained by any convenient method known to the art. To take again the example of the separation of methane from nitrogen, we have found that chilling the incoming feed stream can increase the selectivity of super-glassy membranes for methane over nitrogen significantly. This discovery is explained in detail in co-owned and copending patent application Ser. No. 08/608, 743, entitled "Methane/Nitrogen Separation Process", incorporated herein by reference in its entirety. Any desired degree of chilling can be used, although we recommend to operate in the preferred temperature ranges disclosed in the co-owned and copending patent application referred to above. It is also advantageous when performing ethylene/nitrogen separations to operate at subambient temperatures.

The gas streams to which the invention is applied may be subjected to any known treatments upstream or downstream of the membrane process for removing other constituents from the gas stream or for augmenting the separation achieved by the membranes. Such treatments include, but are not limited to, other membrane separations, condensation, absorption, adsorption and distillation, and may be applied to any or all of the feed, residue and permeate streams. As just one example, it is often desirable to treat the permeate stream to separate the condensable gas from the $C_1$ or $C_2$ hydrocarbon gas, particularly if the condensable gas was added solely for the purpose of facilitating the membrane separation. Many ways to make use of the process of the invention as a stand-alone operation or to incorporate it into other separation and treatment schemes will suggest themselves to those of skill in the art based upon the teachings given herein.

The invention is now further illustrated by the following examples, which are intended to be illustrative of the invention, but are not intended to limit the scope or underlying principles of the invention in any way.

EXAMPLES

Example 1

PTMSP films were prepared by hand-casting from a solution of 2 wt % polymer in toluene onto a glass plate. The finished films had thicknesses in the range 15–40 μm. Stamps with an area of 12.6 cm² were cut from the films and mounted in a test cell. Pure methane gas permeation measurements were made at room temperature (25° C.) for several films. The feed pressure was 50 psig and the permeate pressure was atmospheric in each case. Gas flow rates were measured with soap-film riometers. The permeability of the films to methane was about 15,400 Barrer in each case.

Example 2

Gas permeation measurements were made as in Example 1, this time using n-butane as the test gas, and running at a feed pressure of 10 psig. The permeability of the films to n-butane was found to be about 75,000 Barrer.

Example 3

Gas permeation measurements were made as in Example 1, this time using propane as the test gas, and running at a feed pressure of 50 psig. The permeability of the films to propane was found to be about 30,300 Barrer.

Example 4

Gas permeation measurements were made as in Example 1, this time using nitrogen as the test gas, and running at a feed pressure of 50 psig. The permeability of the films to nitrogen was found to be about 6,300 Barrer.

Example 5

Figure 2:
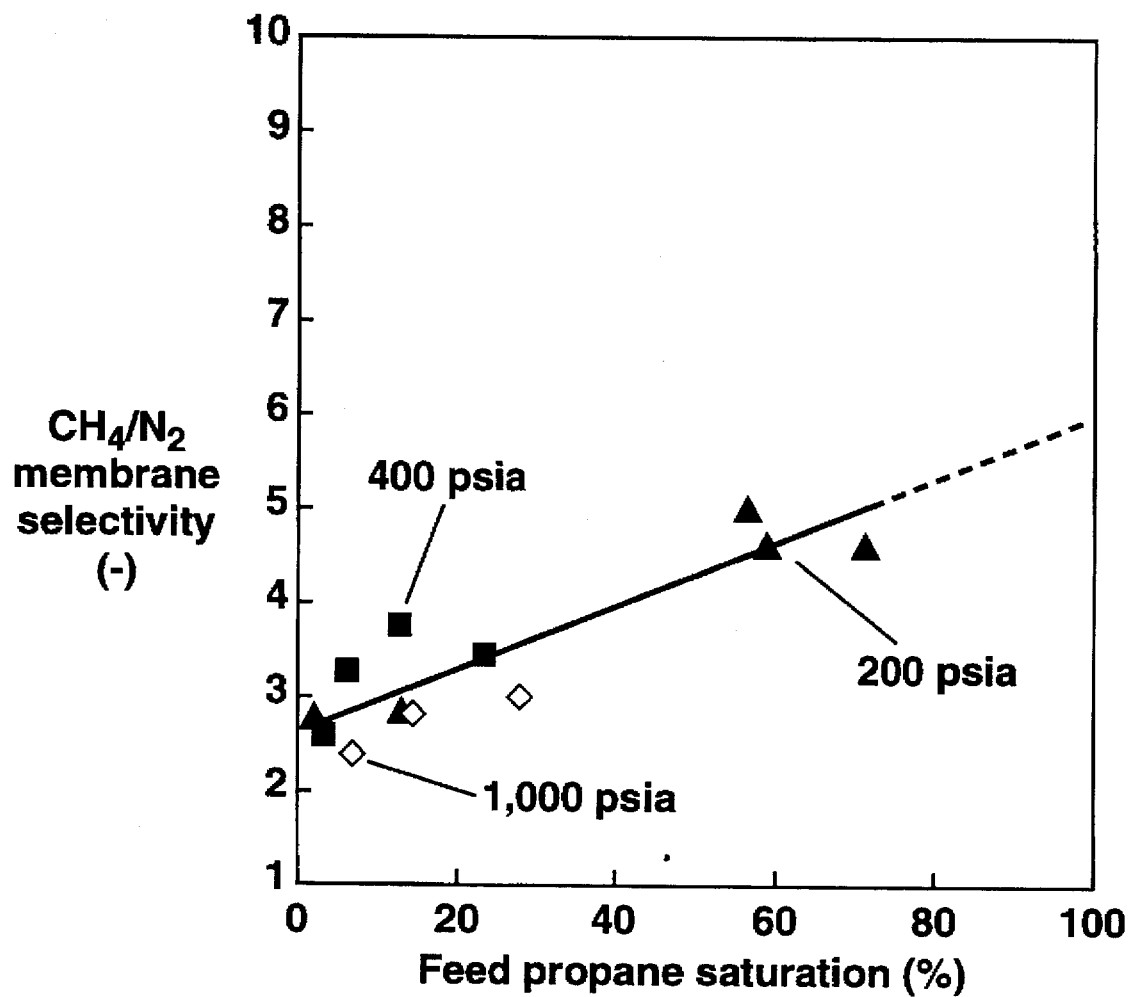
FIG. 2 is a graph of methane/nitrogen selectivity as a function of fractional saturation of the feed gas with condensable gas.

A set of experiments was carried out using three-component gas mixtures containing nitrogen and methane as non-condensable component and propane as condensable component. The experimental procedures were generally as described above. The experiments were started at a feed pressure of 1,000 psia. However, the gas cylinders from which the gas mixture was drawn became rapidly depleted, and it was found that 1,000 psia feed pressure could not be maintained. Thereafter, lower feed pressures of 400 psia and 200 psia had to be used. The calculated pressure-normalized fluxes for the three components are shown graphically in FIG. 1. The calculated selectivities are shown in FIG. 2. In both figures, the results are expressed as a function of the fractional propane saturation of the feed, expressed this time as a percentage.

As can be seen, the presence of propane in the mixture depresses the permeability of the membrane to both methane and nitrogen. However, the nitrogen flux falls more sharply, from about $6\times10^{-5}$ cm³(STP)/cm²·s·cmHg in the absence of propane to below $1\times10^{-5}$ cm³(STP)/cm²·s·cmHg at high propane activity. The methane flux drops only from about $1.5\times10^{-4}$ cm³(STP)/cm²·s·cmHg in the absence of propane to about $6\times10^{-5}$ cm³s(STP)/cm²·s·cmHg at high propane activity. The result is an increase of methane/nitrogen selectivity from about 2.6 in the binary mixture to 6 or more as the propane content of the feed approaches saturation, as shown in FIG. 2.

We claim:

1. A gas-separation process comprising:
   (a) providing a membrane having a feed side and a permeate side; said membrane comprising a polymer material characterized by:
      (i) a glass transition temperature, $T_g$, of at least about 100° C.,
      (ii) a free volume $V_F$ of at least about 10% and
      (iii) a methane permeability at room temperature of at least about 1,000 Barrer;
   (b) contacting said feed side with a gas mixture comprising:
      (i) a hydrocarbon gas chosen from the group consisting of methane and ethylene,
      (ii) nitrogen; and
      (iii) a condensable gas that has a boiling point at least about 40° C. above the boiling point of said hydrocarbon gas at atmospheric pressure;
   (c) withdrawing from said permeate side a permeate stream enriched in said hydrocarbon gas and said condensable gas compared with said gas mixture;
   (d) withdrawing from said feed side a residue stream enriched in said nitrogen compared with said gas mixture.

2. The process of claim 1, wherein said glass transition temperature, $T_g$, is at least about 200° C.

3. The process of claim 1, wherein said free volume $V_F$ is at least about 20%.

4. The process of claim 1, wherein said polymer material is a substituted polyacetylene.

5. The process of claim 1, wherein said polymer material is a silicon-containing polyacetylene.

6. The process of claim 1, wherein said polymer material is polytrimethylsilylpropyne.

7. The process of claim 1, wherein said hydrocarbon gas is methane.

8. The process of claim 1, wherein said hydrocarbon gas is ethylene.

9. The process of claim 1, wherein said condensable gas is a $C_{3+}$ hydrocarbon.

10. The process of claim 1, wherein said condensable gas is propane.

11. The process of claim 1, wherein said condensable gas is butane.

12. The process of claim 1, wherein said condensable gas is pentane.

13. The process of claim 1, wherein said condensable gas is hexane.

14. The process of claim 1, wherein said condensable gas has an activity in said gas mixture, where activity is expressed as the ratio $p/p_{sat}$, where p is the partial pressure of said condensable gas in said gas mixture at the temperature at which said process is carried out and $p_{sat}$ is the saturated vapor pressure of said condensable gas at said temperature, of at least 0.05.

15. The process of claim 1, wherein said condensable gas has an activity in said gas mixture, where activity is expressed as the ratio $p/p_{sat}$, where p is the partial pressure of said condensable gas in said gas mixture at the temperature at which said process is carried out and $p_{sat}$ is the saturated vapor pressure of said condensable gas at said temperature, of at least 0.1.

16. The process of claim 1, wherein said condensable gas has an activity in said gas mixture, where activity is expressed as the ratio $p/p_{sat}$, where p is the partial pressure of said condensable gas in said gas mixture at the temperature at which said process is carried out and $p_{sat}$ is the saturated vapor pressure of said condensable gas at said temperature, of at least 0.2.

17. The process of claim 1, wherein said condensable gas has an activity in said gas mixture, where activity is expressed as the ratio $p/p_{sat}$, where p is the partial pressure of said condensable gas in said gas mixture at the temperature at which said process is carried out and $p_{sat}$ is the saturated vapor pressure of said condensable gas at said temperature, of at least 0.5.

18. The process of claim 1, wherein said gas mixture comprises natural gas.

19. The process of claim 1, wherein said gas mixture comprises purge gas from a manufacturing process manufacturing an ethylene-based polymer.

20. A gas-separation process comprising:
(a) providing a membrane having a feed side and a permeate side; said membrane comprising a polymer material characterized by:
   (i) a glass transition temperature, $T_g$, of at least about 100° C.,
   (ii) a free volume $V_F$ of at least about 10%, and
   (iii) a methane permeability at room temperature of at least about 1,000 Barrer;
(b) contacting said feed side with a gas mixture comprising:
   (i) a hydrocarbon gas chosen from the group consisting of methane and ethylene,
   (ii) nitrogen; and
   (iii) a condensable gas that has a boiling point at least about 40° C. above the boiling point of said hydrocarbon gas at atmospheric pressure;
(c) withdrawing from said permeate side a permeate stream enriched in said hydrocarbon gas and said condensable gas compared with said gas mixture;
(d) withdrawing from said feed side a residue stream enriched in said nitrogen compared with said gas mixture; said process being characterized in that said membrane, when in use in said process, exhibits a hydrocarbon gas/nitrogen selectivity of at least about 4.

* * * * *